Figure 1:
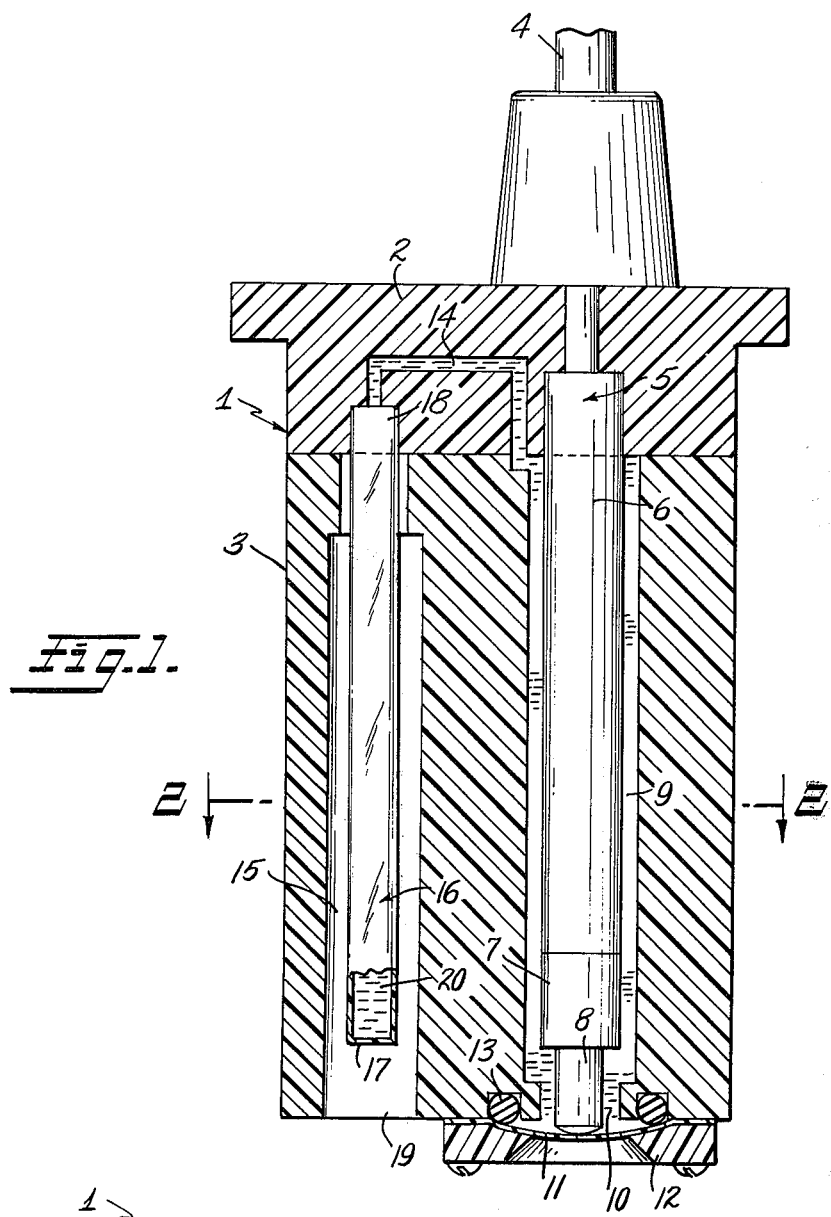
Figure 2:
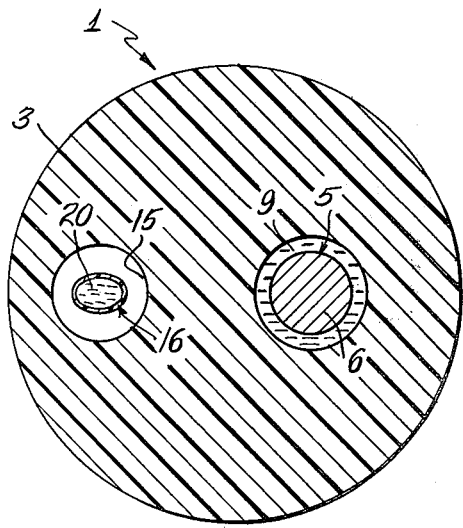

United States Patent [19]

Porter

[11] 3,929,603

[45] Dec. 30, 1975

[54] ELECTROLYTIC SENSOR WITH PRESSURE COMPENSATING MEANS

[75] Inventor: Joe A. Porter, Whittier, Calif.

[73] Assignee: Uniloc, Inc., Irvine, Calif.

[22] Filed: Mar. 7, 1974

[21] Appl. No.: 449,139

[52] U.S. Cl. ............................................. 204/195 P
[51] Int. Cl.² ........................................ G01N 27/46
[58] Field of Search ............ 204/195 P, 1 T; 138/30

[56] References Cited
UNITED STATES PATENTS

| 273,379 | 4/1883 | Miller | 138/30 |
|---|---|---|---|
| 315,453 | 4/1885 | Waddell | 138/30 |
| 3,325,378 | 6/1967 | Greene et al. | 204/1 T |
| 3,503,861 | 3/1970 | Volpe | 204/195 P |
| 3,510,421 | 5/1970 | Gealt | 204/195 P |
| 3,577,332 | 5/1971 | Porter et al. | 204/195 P |

*Primary Examiner*—G. L. Kaplan
*Attorney, Agent, or Firm*—Alexander D. Ricci; Steven H. Markowitz

[57] ABSTRACT

The present invention is directed to a means for compensating for pressure changes in sensing devices. It is important that any sensing means immersed in a medium have internal and external pressures which are preferably the same or very close.

The invention can be specifically illustrated as it applies to a cell for electrochemical analysis of a constituent in a sample. The cell comprises a body having an electrolyte reservoir, a pair of spaced electrodes positioned in the reservoir and adapted to be joined by an electrolyte in the reservoir. An opening communicates between the reservoir and the exterior of the body with a thin, flexible membrane permeable to the constituent and impermeable to electrolyte, mounted under tension over one of the electrodes, and in a position to close the opening. A passage in the body communicates between the reservoir and the exterior of the body. The improvement comprises the use of an eliptically shaped, flexible, hollow pressure compensating tube connected to the exterior end of the passage. The end of the tube farthest from the passage is closed so as to permit containment of a quantity of an electrolyte.

4 Claims, 2 Drawing Figures

ELECTROLYTIC SENSOR WITH PRESSURE COMPENSATING MEANS

BACKGROUND OF THE INVENTION

The present invention is directed to sensoring apparatus which find utility in measuring various aspects of liquid mediums. More specifically the invention provides a means for pressure compensating an amperometric sensor which utilizes a semi-permeable membrane to separate the internal elements and the electrolyte contained therein (and enveloping the elements) from the media being sampled, monitored or analyzed. In this regard reference is hereby made to U.S. Pat. No. 3,577,332 Porter et al which comprehensively describes the type sensing apparatus which are available and the type of measurements or analyses which are commonly made utilizing these means. In addition Porter et al point out the need for pressuring compensating means and procedures and the problems incurred where this is not adequately provided for.

Sensors of the type described and to which the present invention is directed require that the membrane be maintained in a very stable relationship with respect to the surface of the cathode element.

Since the membranes used generally range from less than one to five thousandths inch in thickness, they are obviously quite fragile. Subjecting such a sensor to a pressure differential between the inside and outside will therefore cause movement of the membrane and a resultant change in sensor output.

In order to avoid the above problem and maintain sensor stability, it is necessary to provide a communications path between the electrolyte and the external environment. Such a path may be as simple as a poorly sealed membrane, a drilled passage through the body or a somewhat more elaborate opening sealed with a flexible diaphragm. While all of these schemes will provide pressure compensation, they suffer such problems as electrolyte leakage, non-electrical isolation when used in liquid systems, and, in the case of the diaphragm seal, a limited range of pressure compensation.

GENERAL DESCRIPTION OF THE INVENTION

As earlier described, various means have been utilized in sensing devices to compensate for external changes in pressure. Applicant has discovered that the use of an eliptically shaped tube rather than cylindrical tubes, or membranes is much more satisfactory for the purpose. The invention can be highlighted by describing such in a typical arrangement. In this regard consider a cell for the electrochemical analysis of a constituent in a sample. The cell generally comprises a body having an electrolyte reservoir therein, a pair of spaced electrodes positioned in the reservoir and adapted to be joined by an electrolyte in the said reservoir. An opening communicates the reservoir and the exterior of the body, with a thin, flexible membrane permeable to the said constituent and impermeable to electrolyte, mounted under tension over one of the electrodes and in a position to close the opening. A passage in the body communicates between said reservoir and the exterior of the body. The improvement of the invention comprises the use of an eliptically shaped, flexible, hollow pressure compensating tube connected to the exterior end of the passage. The end of the tube farthest from the passage is closed so as to permit containment of a quantity of an electrolyte. The length of the tube is approximately the same length as the reservoir to assure proper and adequate compensation.

SPECIFIC EMBODIMENTS

Having thus described the invention generally reference is now made to the Drawing which illustrates the invention in a particular arrangement. In this arrangement the pressure compensating tube is in fact housed in the same structural element (body) as the electrode and the reservoir. This aspect although preferred is not essential.

FIG. 1 is an enlarged fragmentary exploded vertical sectional view of the electrochemical cell illustrating the various aspects of the invention. More specifically, cell 1 is composed of housing 2 and structural element 3. To housing 2 is attached cable assembly 4 which provides for the electrical connection (not shown) derived from electrode 5. Electrode 5 which is embedded in housing 2 is comprised of anode 6 insulating sleeve 7 and cathode 8. Electrode 5, is fitted in reservoir 9 of structural element 3 which communicates to the outside of cell 1 through opening 10. Cathode 8 of electrode 5 protrudes through opening 10 but is covered by membrane 11 which is tensioned by compression of cap 12 against O-rings 13. Communicating with reservoir 9 and connecting reservoir 9 with cavity 15 of element 3 is passage 14. At its external end or the end of passage 14 which is farthest from reservoir 9 is connected pressure compensating tube 16.

As earlier described, tube 16 is hollow, flexible, and eliptical or semi-eliptical in shape. Its end 17 is closed so as to permit the tube to contain a quantity of an electrolyte. Although not shown, the open end 18 of tube 16 can be connected to passage 14 through the use of an embedded connector tube over which 18 can be installed. In order for the pressure compensating means to be operative opening 19 is provided in element 3. This opening of course permits the passage of fluid into cavity 15 to in turn activate any pressure compensation if in fact needed.

In operation the cell is immersed in the media being sampled or monitored. A portion of the media enters opening 19 and fills cavity 15. Reservoir 9 as is pressure compensating tube 16 is filled with an appropriate electrolyte 20. Accordingly any increase or decrease in pressure of the media or fluid being monitored is transmitted through, compressing or decompression of tube 16 on electrolyte 20 affecting the pressure of electrolyte 20 in reservoir 9.

The technique permits the maintenance essentially of zero (0) pressure differential across membrane 11.

It is essential that the pressure compensator tube be of a shape other than cylindrical in order to achieve expansion or contraction with minimum resistance and without stretching or deforming as is the case with cylindrical compensating tubes. As can be appreciated, any change of shape from the original shape of the compensating tube would introduce variables into the measurement to be conducted. The pressure compensation tube also provides for expansion and contraction of the sensor body and contained electrolyte due to temperature changes. This feature is of particular importance when a sensor is calibrated in warm air and then immersed in a cold liquid.

The pressure compensating tube of the invention may be made of any flexible material so long as such is resistant to attack by either the electrolyte or the media in which it is immersed. Polyethylene has found widespread acceptability for the purpose since it provides little resistance when compressed and is not susceptible to chemical attack.

The tube preferably is approximately the same length or slightly shorter than the reservoir in which the electrode is located. The diameter of such should be sufficient to assure that a sufficient quantity of electrolyte can be contained therein to assure proper compensation.

Having thus described the invention, what is claimed is:

1. A cell for electrochemical analysis of a constituent in a sample comprising a body having an electrolyte reservoir therein, a pair of spaced electrodes positioned in said reservoir and adapted to be joined by an electrolyte in said reservoir, an opening communicating between said reservoir and the exterior of said body, a thin, flexible polymeric membrane permeable to said constituent and impermeable to electrolyte, means mounting said membrane under tension over one of said electrodes and in a position to close said opening, and a passage in said body communicating between said reservoir and the exterior of said body wherein the improvement comprises an eliptically shaped, flexible, hollow tube connected to the exterior end of said passage, said tube having its end farthest from said passage closed so as to permit the tube to contian a quantity of an electrolyte.

2. A cell according to claim 1 wherein the exterior end of said passage is fitted with a tubular means to which is connected said hollow tube.

3. A cell according to claim 2 wherein the length of said hollow tube is approximately the same as the length of said reservoir.

4. A cell according to claim 1 wherein the length of said tube is approximately the same length as the reservoir.

* * * * *